United States Patent
Ueno et al.

(10) Patent No.: US 7,460,749 B2
(45) Date of Patent: Dec. 2, 2008

(54) OPTICAL TRANSMISSION DEVICE THAT EMPLOYS VERTICAL CAVITY SURFACE-EMITTING LASER DIODE AS LIGHT SOURCE

(75) Inventors: Osamu Ueno, Kanagawa (JP); Masao Funada, Kanagawa (JP); Masaaki Miura, Tokyo (JP); Tsutomu Hamada, Kanagawa (JP); Shinya Kyozuka, Kanagawa (JP); Osamu Takanashi, Kanagawa (JP); Hideo Nakayama, Kanagawa (JP); Jun Sakurai, Kanagawa (JP); Akira Sakamoto, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 11/041,442

(22) Filed: Jan. 25, 2005

(65) Prior Publication Data

US 2005/0180688 A1      Aug. 18, 2005

(30) Foreign Application Priority Data

Jan. 28, 2004   (JP)   .............................. 2004-019497

(51) Int. Cl.
 G02B 6/32  (2006.01)
 F21S 13/14  (2006.01)
 G02B 6/30  (2006.01)
 G02B 6/36  (2006.01)

(52) U.S. Cl. .............................. 385/33; 385/31; 385/49; 385/93; 362/230; 362/238; 362/252

(58) Field of Classification Search ............. 385/14–16, 385/21, 39, 41, 43, 50, 127, 129, 147, 123, 385/33, 49, 93; 433/29; 349/230, 231, 236, 349/238, 240, 249, 250, 252

See application file for complete search history.

(56) References Cited

U.S. PATENT DOCUMENTS 4,828,350 A * 5/1989 Kim et al. ..................... 385/28

(Continued)

FOREIGN PATENT DOCUMENTS

JP           A-2-250010           10/1990

(Continued)

*Primary Examiner*—Michelle R. Connelly-Cushwa
*Assistant Examiner*—Rhonda S Peace
(74) *Attorney, Agent, or Firm*—Oliff & Berridge, PLC

(57) ABSTRACT

The first and second light-emitting regions are provided on the light source. When the first optical fiber having the first core diameter is connected, the light emitted from the first light-emitting region enters the first core. When the second optical fiber having a greater core diameter than the first core diameter is connected, the lights emitted from the first and second light-emitting regions enter the second core. It is thus possible to connect the optical transmission device with multiple optical fibers having different core diameters. It is thus possible to provide the optical transmission device and the communication device, which are low in cost and high in convenience.

19 Claims, 7 Drawing Sheets

U.S. PATENT DOCUMENTS

| | | | | |
|---|---|---|---|---|
| 5,074,633 | A | * | 12/1991 | Cohen et al. ............... 385/43 |
| 5,137,351 | A | * | 8/1992 | So ........................... 356/73.1 |
| 5,373,174 | A | * | 12/1994 | Yamamoto ................ 257/88 |
| 5,574,595 | A | * | 11/1996 | Kurata et al. .............. 359/484 |
| 5,729,643 | A | * | 3/1998 | Hmelar et al. ............. 385/43 |
| 6,195,485 | B1 | * | 2/2001 | Coldren et al. ............. 385/49 |
| 6,606,441 | B2 | * | 8/2003 | Irie et al. .................... 385/127 |
| 6,789,957 | B1 | * | 9/2004 | Colgan et al. .............. 385/89 |
| 6,870,195 | B2 | * | 3/2005 | Lemoff et al. .............. 257/79 |
| 7,061,945 | B2 | * | 6/2006 | Cox et al. ................... 372/19 |
| 7,101,072 | B2 | * | 9/2006 | Takada et al. .............. 362/573 |
| 7,221,828 | B2 | * | 5/2007 | Nakayama et al. ......... 385/49 |
| 7,347,629 | B2 | * | 3/2008 | Shibayama et al. ........ 385/88 |
| 2002/0141472 | A1 | * | 10/2002 | Koyama et al. ............ 372/96 |
| 2004/0061346 | A1 | * | 4/2004 | Capewell ................... 294/64.1 |
| 2004/0247011 | A1 | * | 12/2004 | Okazaki et al. ............. 372/108 |
| 2004/0252736 | A1 | | 12/2004 | Nakayama et al. |
| 2005/0031354 | A1 | | 2/2005 | Ohashi et al. |
| 2005/0110173 | A1 | * | 5/2005 | Lee et al. ................... 264/1.29 |
| 2006/0178457 | A1 | * | 8/2006 | Sasaki et al. ............... 524/100 |

FOREIGN PATENT DOCUMENTS

| | | |
|---|---|---|
| JP | A-6-97578 | 4/1994 |
| JP | A-08-340156 | 12/1996 |
| JP | A-10-104474 | 4/1998 |
| JP | A-11-289317 | 10/1999 |
| JP | A-2000-299534 | 10/2000 |
| JP | A-2002-48930 | 2/2002 |
| JP | A-2002-107581 | 4/2002 |
| JP | A-2002-252416 | 9/2002 |
| JP | A-2003-152284 | 5/2003 |
| JP | A-2005-3847 | 1/2005 |
| JP | A-2005-49830 | 2/2005 |

* cited by examiner

OPTICAL TRANSMISSION DEVICE THAT EMPLOYS VERTICAL CAVITY SURFACE-EMITTING LASER DIODE AS LIGHT SOURCE

BACKGROUND OF THE INVENTION

1. Field of the Invention

This invention relates to an optical transmission device that transmits optical signals, and in particular, to an optical transmission device that can be selectively used for multiple optical fiber shaving different core diameters such as a (silica) glass fiber for long and middle distance transmission and a plastic fiber for short distance transmission.

2. Description of the Related Art

The optical transmission device transmits a light emitted from a light source with an optical fiber, and a vertical cavity surface-emitting Laser diode (hereinafter referred to as VCSEL) is employed in the light source. VCSEL has following advantages. The threshold voltage is low. The power consumption is small. A circular optical spot is easily obtainable. A two-dimensional array can easily be realized.

A large drive current is required to obtain a large optical output in the optical transmission device. However, there is a problem in that the large drive current shortens the life of VCSEL. In order to solve the above-mentioned problem, Japanese Patent Application Publication No. 2003-152284 (hereinafter referred to as Document 1) discloses a technique to prevent the life of VCSEL from becoming shorter. Multiple VCSELs are arranged on a chip to be driven simultaneously so that a quantity of light entering the optical fiber may be kept constant, while keeping the drive current for each VCSEL small. The life of VCSEL is thus prevented from becoming shorter.

Japanese Patent Application Publication No. 8-340156 (hereinafter referred to as Document 2) discloses another type of VCSEL. An upper electrode having four square cavities is provided on a square end face of a single square pillar formed on a substrate. An upper reflecting mirror is provided to cover the four square cavities. This configuration makes it possible to arrange a light-emitting spot in close proximity and make a reflection angle small.

Japanese Patent Application Publication No. 2000-299534 (hereinafter referred to as Document 3) relates to an optical transmission device that includes a two-dimensional laser array provided on a simple square so as to make lights emitted from the lasers enter a multimode optical fiber.

It is well known that there are three optical fibers to transmit the light from VCSEL. There are a single-mode glass optical fiber for long distance communication (hereinafter referred to as SMF), a multimode glass optical fiber for middle distance communication (hereinafter referred to as MMF), and a plastic optical fiber for short distance communication (hereinafter referred to as POF). Typically, the core diameter of SMF is small, for instance, 12.5 µm. SMF is excellent in transmission efficiency, but comes high in cost. The core diameter of MMF is greater than that of SMF, for instance, 50 µm or 62.5 µm. MMF is inferior to SMF in the transmission efficiency, but low in cost. The core diameter of POF is relatively great, for instance, 200 µm or 1 mm. POF is inferior to SMF or MMF in the transmission efficiency, but very low in cost.

The above-mentioned optical fibers are employed according to the purpose. For example, SMF, which has a small light loss and is used for the long distance communication, is employed in a backbone of an optical communications system. Then, SMF is changed to MMF or POF, which are used for short and middle distances, on an optical switching hub. The optical signals are provided from the optical fibers for a home networking or a LAN.

The above-mentioned conventional optical transmission devices, however, have following drawbacks. First, in the case where multiple VCSELs are arranged on the chip as described in Document 1 and are connected to the optical fiber, the multiple VCSELs have large light-emitting points or large light source. This great light source can be applied only to the optical fiber having a large core diameter such as POF. The same is true of the optical transmission devices of Documents 2 and 3. A downsized optical system can be created with the use of an optical lens; however multiple lenses are required for eliminating lens aberration, and so the cost will be increased. In addition, if a reduction ratio becomes greater than a certain value, an incidence angle becomes greater and causes the light loss. This results in a degradation of optical transmission efficiency.

Further, in the case where the backbone SMF is changed to MMF or POF on the optical switching hub as described, the respective optical transmission devices for MMF and POF need to be prepared in advance. This is because MMF and POF have different core diameters. It is not flexible in connecting the optical fiber and the optical switching hub. This causes a problem in that the cost of the optical switching hub or other communication devices that include the optical switching hub is not decreased.

SUMMARY OF THE INVENTION

The present invention has been made in view of the above circumstances and provides an optical transmission device to which multiple optical fibers having different core diameters can be selectively connected. Additionally, the present invention provides the optical transmission device that can reduce the cost and enhance the convenience thereof. Further, the present invention provides the optical transmission device that can efficiently apply the light emitted from the light source to the optical fiber.

According to one aspect of the present invention, preferably, there is provided an optical transmission device including a light source including light-emitting regions, and an optical fiber that transmits lights emitted from the light-emitting regions areas, the light source including a first light-emitting region positioned at a place that corresponds to an optical axis of the optical fiber, and a second light-emitting region positioned at places that surround the first light-emitting region, a light emitted from the first light-emitting region entering a first core of a first optical fiber having a first core diameter, when the first optical fiber is connected to the optical transmission device, lights emitted from the first and second light-emitting regions entering a second core of a second optical fiber having a second core diameter greater than the first core diameter when the second optical fiber is connected to the optical transmission device.

On the above-mentioned optical transmission device, the second light-emitting region has multiple light-emitting regions equally spaced from a center of the first light-emitting region. Preferably, the second light-emitting region has multiple light-emitting regions formed at vertexes of a regular triangle, and the first light-emitting region is positioned at a center of gravity. The configuration having multiple light-emitting regions provided at vertexes of a regular triangle and at the center of gravity is the most excellent in connecting efficiency with the optical fiber having a small core diameter and misalignment between the optical fiber and the lights. There are only three light-emitting regions around the central light-emitting region, the thermal damage of the central light-emitting region is small, and the distances between the respective light-emitting regions can be set relatively small one another.

On the above-mentioned optical transmission device, preferably, the second light-emitting region has multiple light-emitting regions positioned on a circumference of a circle, a center of which coincides with a center of the first light-emitting region. The second light-emitting region area has multiple light-emitting regions positioned asymmetrically with respect to the first light-emitting region. The second light-emitting region has multiple light-emitting regions positioned symmetrically with respect to the first light-emitting region. In the above-mentioned cases, preferably, the quantity of light emitted from the first light-emitting region and that from the second light-emitting region has a ratio of 1/6 or less.

On the above-mentioned optical transmission device, preferably, the second light-emitting region is different in shape and/or size from the first light-emitting region. The second luminous area has multiple light-emitting regions equally spaced one another. The light emitted from the first light-emitting region has a quantity greater than each quantity of light emitted from each light-emitting region included in the second light-emitting region. A quantity of the light emitted from the first light-emitting region and a total of quantities of lights emitted from the first and second light-emitting regions have a ratio of 1/4 or less. The first and second light-emitting regions include multiple vertical cavity surface-emitting laser diodes arranged on a single substrate.

On the above-mentioned optical transmission device, preferably, the first optical fiber having the first core diameter is a mulitmode glass optical fiber, and the second optical fiber having the second core diameter is a plastic fiber. The laser beams emitted from the first and second light-emitting regions fall in a 780 nm band. The first and second light-emitting regions emit multimode laser beams. The second optical fiber is a GI(graded Index)-type plastic fiber. With the above-mentioned optical fibers can be used for high-speed optical communications ranging from middle to short distance communication.

On the above-mentioned optical transmission device, preferably, further includes an antireflection film provided in an area other than the first core on an incident surface of the first optical fiber, and the light emitted from the second light-emitting region enters the antireflection film when the first optical fiber is connected to the optical transmission device. It is thus possible to suppress the dispersion of the lights that do not enter the first core.

On the above-mentioned optical transmission device, preferably, further includes an optical lens arranged between the light source and the optical fiber.

On the above-mentioned optical transmission device, preferably, further includes a drive circuit that stops an emission from the second light-emitting region, when the first optical fiber is connected to the optical transmission device.

According to another aspect of the present invention, preferably, there is provided an optical transmission system including an optical transmission device and an optical reception device. The optical transmission device comprises a light source including light-emitting regions and an optical fiber that transmits lights emitted from the light-emitting regions, the light source including a first light-emitting region positioned at a place that corresponds to an optical axis of the optical fiber, and a second light-emitting region positioned at places that surround the first light-emitting region, a light emitted from the first light-emitting region entering a first core of a first optical fiber having a first core diameter, in a case where the first optical fiber is connected to the optical transmission device, lights emitted from the first and second light-emitting regions entering a second core of a second optical fiber having a second core diameter greater than the first core diameter when the second optical fiber is connected to the optical transmission device.

In accordance with the present invention, the first and second light-emitting regions are provided on the light source. When the first optical fiber having the first core diameter is connected, the light emitted from the first light-emitting region enters the first core. When the second optical fiber having a greater core diameter than the first core diameter is connected, the lights emitted from the first and second light-emitting regions enter the second core. It is thus possible to connect the optical transmission device with multiple optical fibers having different core diameters. It is thus possible to provide the optical transmission device and the communication device, which are low in cost and high in convenience.

BRIEF DESCRIPTION OF THE DRAWINGS

An embodiment of the present invention will be described in detail based on the following figures, wherein.

DESCRIPTION OF THE EMBODIMENTS

A description will now be given, with reference to the accompanying drawings, of embodiments of the present invention.

An optical transmission device of the present invention transmits the light emitted from the light source with the optical fiber, and is used for an optical device and optical communications system. In particular, the optical transmission device of the present invention is preferably used with an optical switching hub, on which the backbone SMF for long distance optical communication is switched to MMF or POF for short or middle distance communication.

Figure 1:
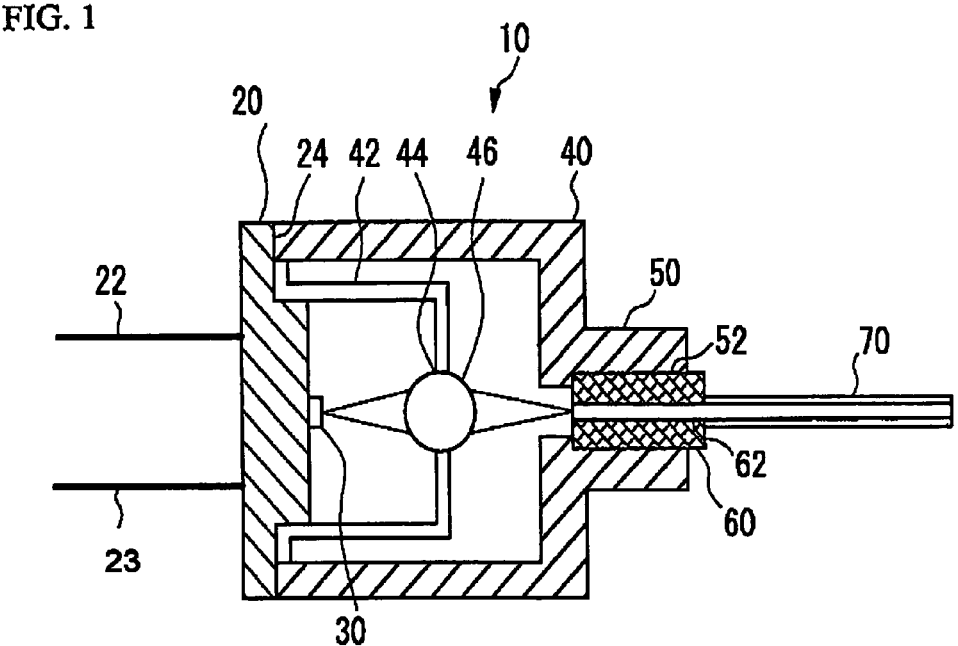
FIG. 1 is a cross-sectional view of an optical transmission device that forms an optical system of same magnification with the use of a spherical lens in accordance with the embodiment of the present invention.

Referring to FIG. 1, a description will now be given of an embodiment of the present invention. FIG. 1 is a cross-sectional view of an optical transmission device that forms an optical system of a 1:1 magnification ratio with the use of a spherical lens in accordance with the embodiment of the present invention. An optical transmission device 10 includes a metal stem 20, a light source 30, a chassis 40, a sleeve 50, a ferrule 60, and an optical fiber 70. The metal stem 20 has a disk shape. The light source 30 includes multiple VCSELs positioned and secured on the metal stem 20 by a mounter (not shown). The chassis 40 has a cylindrical shape and is secured to the metal stem 20. The sleeve 50 is an end portion of the chassis 40. The ferrule 60 is held in an opening 52 in the sleeve 50. The optical fiber 70 is held by the ferrule 60.

Multiple through-holes (not shown) are provided on the metal stem 20, and pierce the front and back surfaces thereof. The inner walls of the through-holes are coated with an insulation film. Lead pins 22 and 23 are inserted into the through-holes, and are electrically insulated. Ends of the lead pins 22 and 23 are exposed from the surface of the metal stem 20, and are electrically coupled to p-side and n-side electrodes of the VCSELs by bonding wires. A flange 24, which is formed in the circumferential direction of the metal stem 20, is connected to an end of the chassis 40. A supporting portion 42 is attached on the flange 24 inside the chassis 40. The supporting portion 42 has a cylindrical shape and is concentric with the chassis 40. A round opening 44 is formed on an end of the supporting portion 42. A single spherical lens 46 is arranged between the light source 30 and an incident surface of the optical fiber 70. The spherical lens 46 is positioned and secured in the opening 44 of the supporting portion 42 so that the optical axis may correspond to a central VCSEL 32 of the light source 30. The ferrule 60 is accurately positioned on the edge of the opening 52 of the sleeve 50, so that the optical axis of the optical fiber 70 corresponds to the optical axis of the spherical lens 46. A cable core 72 of the optical fiber 70 is inserted into a through-hole 62 of the ferrule 60.

Laser beams emitted by the light source 30, namely, the VCSELs are condensed by the spherical lens 46, and enter the cable core 72. The use of the spherical lens 46 may slightly reduce the accuracy of the ferrule 60. The spherical lens 46 may be replaced by a biconvex lens or plane-convex lens.

The optical transmission device 10 in accordance with the embodiment of the present invention is capable of selectively connecting the multiple optical fibers having different core diameters and is capable of obtaining a sufficient quantity of light for the optical communication from the light source regardless of the type of fiber. For instance, for the short distance optical communication such as a home networking or a LAN, POF having a relatively large core diameter is connected. For the middle distance optical communication, MMF having a relatively small core diameter is connected. The changeover between POF and MMF may be realized by replacing the ferrule 60 with POF or MMF being incorporated therein. If the optical fibers have the same core size, the ferrule 60 may not be needed to be replaced. In addition, preferably, a GI-type (Graded Index) is used for to realize high-speed communication (gigabit-class) with restrained phase difference in the wave plane.

Figure 2:
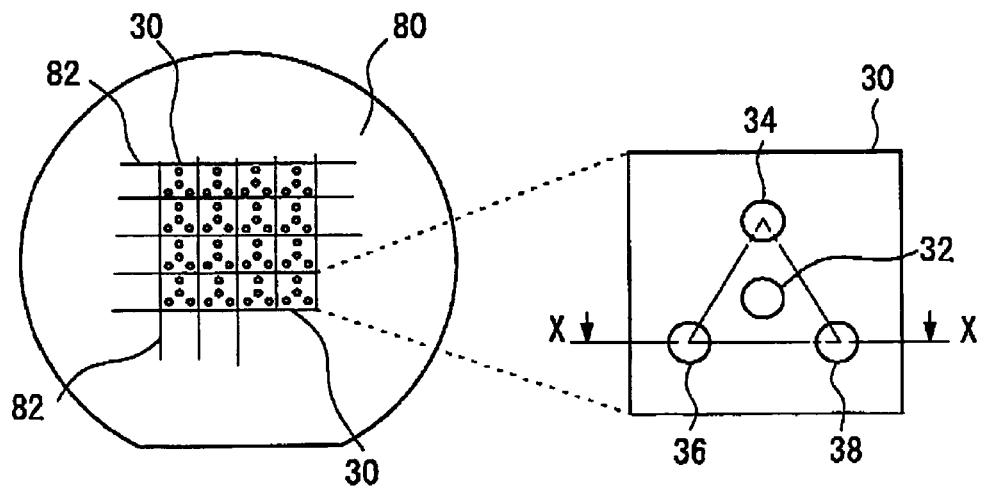
FIG. 2 is a plain view of a layout of VCSELs arranged on a semiconductor wafer.

Next, a description will be given of an optical source used in the optical transmission device 10. FIG. 2 is a plan view showing a layout of the VCSELs arranged on a semiconductor wafer 80, which may be divided into chips having a rectangular or square shape by dicing along scribe lines 82. The present invention has multiple VCSELs formed on the chip, namely, the light source 30. One of the VCSELs is arranged to correspond to the optical axis of the optical fiber 70 and is surrounded by the multiple VCSELs. In accordance with the embodiment of the present invention, a line connecting VCSELs 34, 36, and 38 forms a triangle, and the central VCSEL 32 is arranged at the center of gravity that corresponds to the optical axis.

The VCSELs 32, 34, 36, and 38 will be described later in detail; however, each VCSEL has a configuration of a selective oxidized mesa or a post structure. The p-side electrodes and n-side electrodes of the respective VCSELs are commonly shared. When a drive current is applied to the electrodes, the respective VCSELs emit the laser beams at the same time. A laser emission wavelength is a multimode light and falls in a 780 nm (770-810 nm) band.

Figure 3:
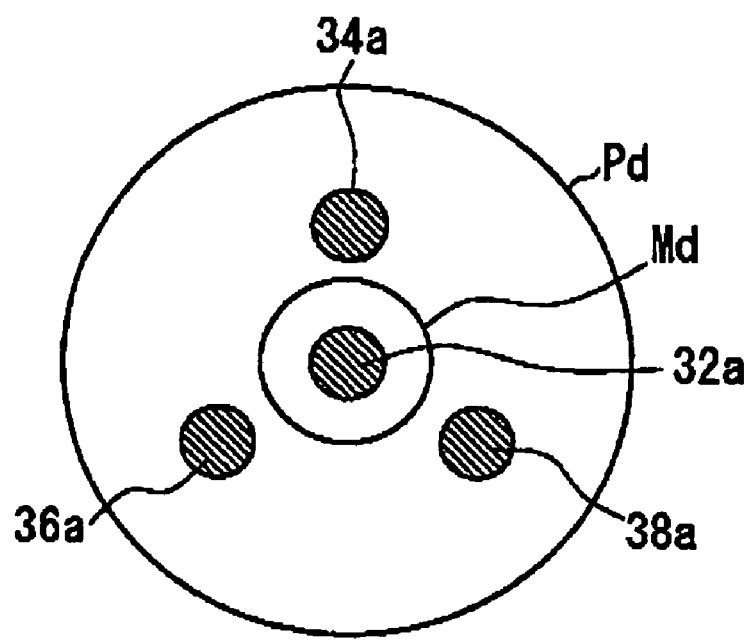
FIG. 3 shows an image of the VCSELs reflected on the incident surface of a cable core 72.

The light emitted by the light source 30 enters the cable core 72 of the optical fiber 70, as shown in FIG. 1. The cable core 72 includes a core, a clad, and a buffer layer. All the lights entered the core are transmitted by total reflection. FIG. 3 shows an image of the VCSELs reflected on the incident surface of the cable core 72. In FIG. 3, Pd denotes the core diameter when POF is connected, and Md denotes the core diameter when MMF is connected. For instance, the core diameter of POF is 300 μm, and the core diameter of MMF is 50 μm. 32a, 34a, 36a, and 38a are the images of the VCSELs 32, 34, 36, and 38 which are reflected on the incident surface.

As shown in FIG. 3, the VCSEL 32 corresponds to the optical axis of the optical fiber, and the remaining VCSELs 34, 36, and 38 are arranged at a certain interval from the VCSEL 32. When POF is connected, the lights from the images 32a, 34a, 36a, and 38a of all the VCSELs enter the core diameter Pd. When MMF is connected, the light from the image 32a of the VCSEL 32 enters the core diameter Md.

When MMF is connected, the quantity of light emitted from the central VCSEL 32 is applied to the optical fiber. MMF is efficient in the transmission and is small in the light loss as compared to POF. It is thus possible to conduct the optical communication with the quantity of light emitted from only one VCSEL. The VCSEL 32 is located at the center of the core of MMF, and the light emitted by the VCSEL 32 enters the core without loss. With the above-mentioned positional relationship, even if MMF and the VCSEL 32 are misaligned more or less, the affect can be minimized.

Figure 4A:
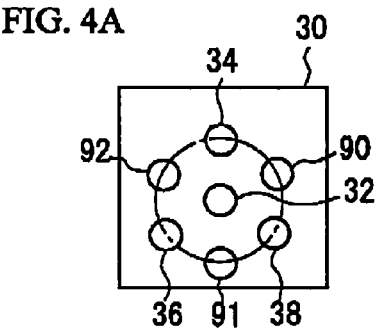
FIGS. 4A and 4B show layouts of the remaining VCSELs in accordance with the embodiment of the present invention.
Figure 4A:
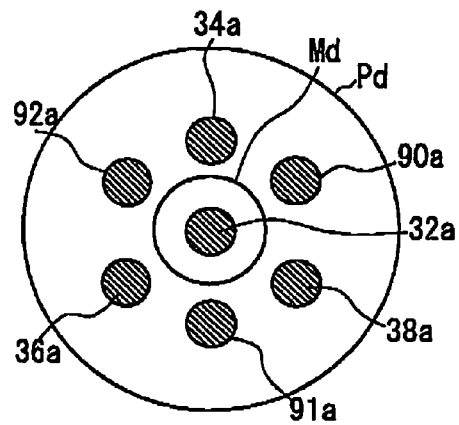
Figure 4B:
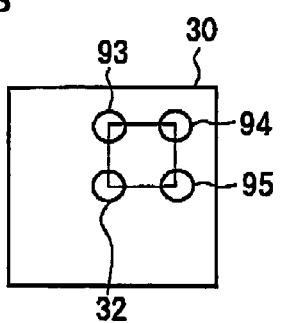
Figure 4B:
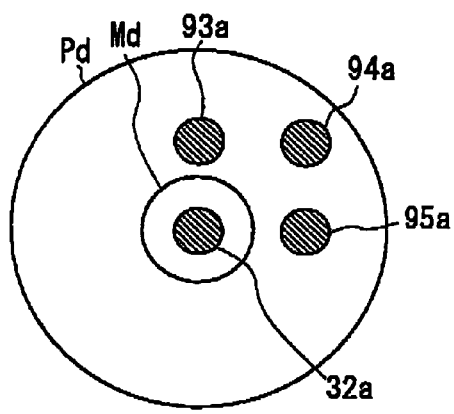

FIGS. 4A and 4B show layouts of the remaining VCSELs in accordance with the embodiment of the present invention. In addition to the VCSELs shown in FIG. 2, three VCSELS 90, 91, and 92 are provided on the light source 30. The VCSELs 90, 91, and 92 are respectively arranged at the same interval from the VCSEL 32. That is to say, the six VCSELs surrounding the central VCSSL 32 are arranged symmetrically with respect to the central VCSEL 32. In other words, the VCSELs have totally seven light-emitting points, which are positioned at the vertexes of a regular hexagon and at the center of the regular hexagon. The images reflected on the incident surface of the optical fiber are shown on the right of FIGS. 4A and 4B. When POF is connected, all the images 32a, 34a, 36a, 38a, 90a, 91a, and 92a are included in the core diameter Pd. When MMF is connected, the image 32a of the VCSEL 32 is included in the core diameter Md.

Referring to FIG. 4B, the remaining VCSELs may be arranged asymmetrically with respect to the central VCSEL 32. That is to say, the central VCSEL 32 is located at one vertex of a square, and the remaining VCSELs 93, 94, and 95 are located on the remaining vertexes of the square. In this case, as described above, when POF is connected, the the images 32a, 93a, 94a, and 95a of all the VCSELs are included in the core diameter Pd, and when MMF is connected, the image 32a of the central VCSEL 32 is included in the core diameter Md. (See the right figure of FIG. 4B)

Figure 4C:
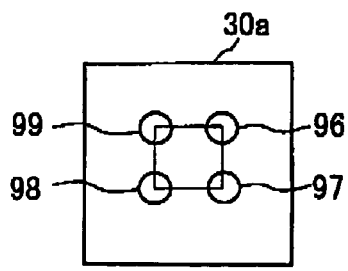
FIG. 4C illustrates another layout as a comparative example.
Figure 4C:
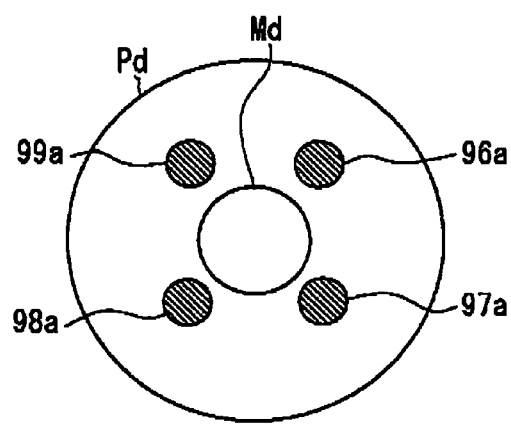

FIG. 4C illustrates another layout as a comparative example. That is, a light source 30a includes four VCSELs 96, 97, 98, and 99, as shown in FIG. 4B. However, any one of the VCSELs does not correspond to the optical axis of the optical fiber. The same effect as the embodiment of the present invention is obtainable by adjusting the images 96a, 97a, 98a, and 99a of the VCSELs so as to surround the core diameter Md on the incident surface of the optical fiber. However, in this case, the positions if the VCSELs are originally deviated from the core. As compared to FIGS. 2, 4A, and 4B, the tolerance to the misalignment is small and it is difficult to retain the sufficient quantity of light of MMF to the core. As a result, among the layouts of the VCSELs described above, satisfactory results are obtainable when the VCSELs are arranged at the vertexes of the triangle and the center of gravity as shown in FIG. 2., with respect to the connecting efficiency with the optical fiber and the misalignment when the optical fiber having a small core diameter such as MMF is connected. Additionally, only three light-emitting regions exist surrounding the central light-emitting region, and there are advantages in that the thermal damage is small in the central light-emitting region and the respective distances between the light-emitting regions can be set relatively short.

In the case where the layout of the VCSELs shown in FIG. 2 or FIG. 4B is employed, the quantity of light emitted from one VCSEL is set to P, and the total quantity of light (Tp) emitted into the core is equal to 4P, when POF is connected. That is, Tp is equal to 4P. When MMF is connected, the total quantity of light, Tp is equal to 1P. That is, the ratio of the quantity of light is 1:4. The international safety standard (IEC60825-1) specifies laser products. In the case where the sufficient quantity of light is retained for MF and the ratio or difference in the quantity of light becomes too apart, a total of the quantities of lights retained for POF might exceed the safety standard. In contrast, when the total of the quantities of lights is suppressed not to exceed the safety standard, the quantity of lights of MMF might be smaller than the sufficient quantity required for the optical communication. Normally, the allowable light loss is 10-15 dB in a normal optical transmission and reception system. 8 dB or less may be lost in the connecting efficiency in a light incidence portion. (The ratio of the light loss is 1:6.3) Therefore, preferably, the ratio of the quantity of light for MMF to that for POF is 1:6 or less. Practically, 1:4 or less is preferable.

In order to reduce the ratio of quantity of light for connecting POF to that for connecting MMF, for example, the quantity of light emitted from the central VCSEL 32 may be greater than those of the remaining VCSELs. For instance, referring back to FIG. 2, the output of the central VCSEL 32 is set to 0.2 milliwatt and the outputs of the VCSELs 34, 36, and 38 are set to 0.1 milliwatt, the ratio of the quantity of light may be 2:5. In this case, as a method of making the output of the central VCSEL 32 greater than those of the remaining VCSELs, the drive current of the central VCSEL 32 and that of the remaining VCSELs may be separated so that the drive current of the central VCSEL 32 may be higher than those of the remaining VCSELs. As another method, the drive current may be applied to the VCSELs at the same time, but the size and/or shape of the mesa of the VCSEL 32 may be adjustable or different from those of the remaining VCSELs.

Figure 5:
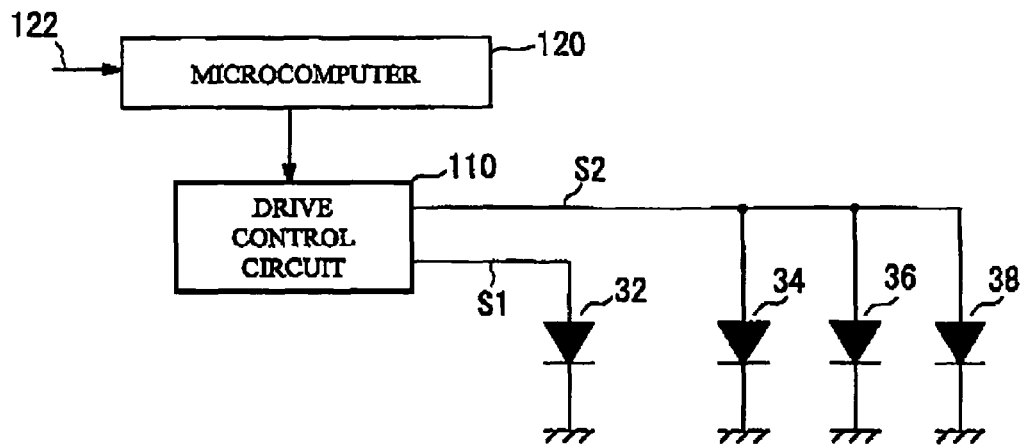
FIG. 5 shows a drive circuit that drives the VCSELs in the light source respectively and separately.

FIG. 5 shows a drive circuit that drives the VCSELs in the light source respectively and separately. In the case where the central VCSEL 32 is arranged at the center of a substrate and the multiple VCSELs are arranged to surround the VCSEL 32 as shown in FIG. 2, the same drive current drives the above-mentioned VCSELs simultaneously, and in addition, the central VCSEL 32 and the surrounding VCSELs 34, 36, and 38 are separately driven by different drive signals. In this case, the p-side electrodes of the central VCSEL 32 and those of the surrounding VCSELs 34, 36, and 38 are separately and respectively connected.

The p-side electrode of the central VCSEL 32 is connected to a drive control circuit 110 by a drive signal S1. The p-side electrodes of the surrounding VCSELs 34, 36, and 38 are common and are connected to the drive control circuit 110 by a drive signal S2. The n-side electrodes of the respective VCSELs are commonly grounded. The drive control circuit 110 follows an instruction of a microcomputer 120. For instance, in the case where the output from the central VCSEL 32 is greater than those from the surrounding VCSELs (for instance, the central VCSEL is set to 0.2 milliwatt, as described), the drive current greater than that of a drive signal S2 is applied to the drive signal In addition, the drive control circuit 110 may not drive the surrounding VCSELs 34, 36, and 38, when MMF is connected. The useless power consumption can be reduced by stopping the lights emitted from the VCSELs that do not enter the core of MMF. In this case, any drive method may be employed so that the output of the central VCSEL 32 may be greater than that when POF is connected.

The microcomputer 120 may input a determination signal 122 so as to determine whether any one of POF and MMF is connected. The determination signal 122 may be output by installing a selector switch for identifying the optical fiber so that a user may operate the selector switch. The microcomputer 120 controls the drive control circuit 110 in response to the determination signal 122, and the drive of each VCSEL is thus controlled.

Figure 6:
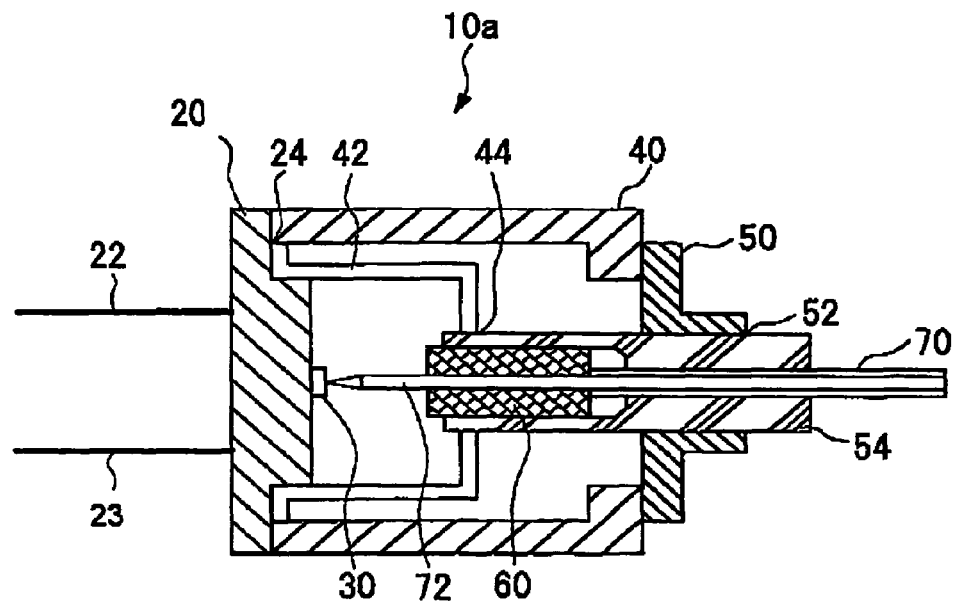
FIG. 6 shows another configuration example of the optical transmission device.

FIG. 6 shows another configuration example of the optical transmission device. Hereinafter, in FIG. 6, the same components and configurations as those of FIG. 1 have the same reference numerals. An optical transmission device 10a does not include the spherical lens arranged between the light source 30 and the optical fiber 70. The light emitted by the light source 30 is directly applied to the optical fiber 70. The sleeve 50 and the chassis 40 are formed separately and can slide in a direction perpendicular to the optical axis. A cylindrical adjuster 54 is attached inside an opening 52 of the sleeve 50. The ferrule 60 is attached inside the opening of the adjuster 54. The position of the sleeve 50 is adjusted to the direction perpendicular to the optical axis and the position of adjuster 54 is adjusted to the optical axis direction. This makes it possible to adjust the distance between a cable core 72 and the light source 30 and adjust the core to the light source 30.

Figure 7A:
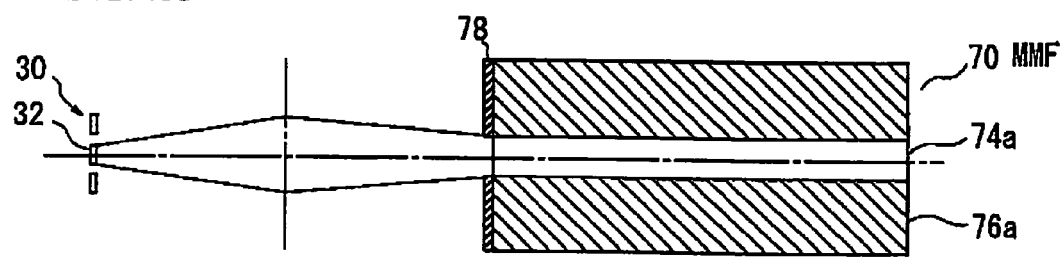
FIGS. 7A and 7B show relationships between the VCSEL (light-emitting region) of the light source 30 and the optical fiber.
Figure 7B:
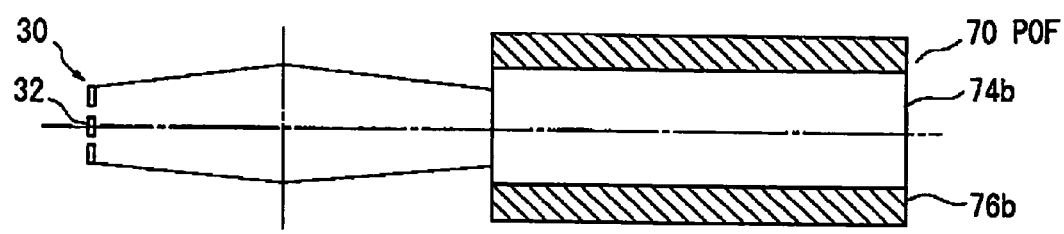

FIGS. 7A and 7B show relationships between the VCSEL (light-emitting region) of the light source 30 and the optical fiber. As shown in FIG. 1, the cable core 72 of the optical fiber 70 is accurately positioned with respect to the light source 30 by the ferrule 60. When MMF is connected, referring to FIG. 7A, the light emitted by the central VCSEL 32 enters a core 74a via the spherical lens 46. In the case where the lights are emitted by the remaining VCSELs 34, 36, and 38 simultaneously, those lights do not enter the core 74a and illuminate an end face of a clad 76a. In this case, an antireflection film 78 may be coated on the end face to suppress the reflection or scattering.

When POF is connected, as shown in FIG. 7B, the lights emitted from all the VCSELs 32, 34, 36, and 38 in the light source 30 enter the core 74b via the spherical lens 46.

Figure 7C:
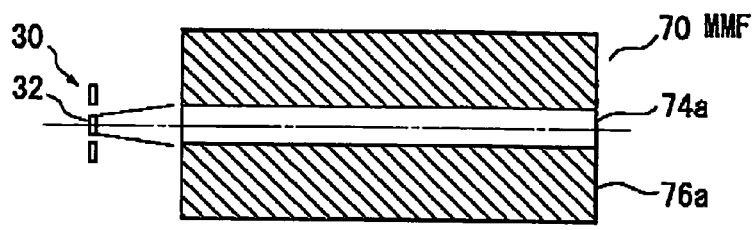
FIGS. 7C and 7D show relationships between the light source 30 and the optical fiber 70 when the lights emitted from a light source 30 enter an optical fiber 70.
Figure 7D:
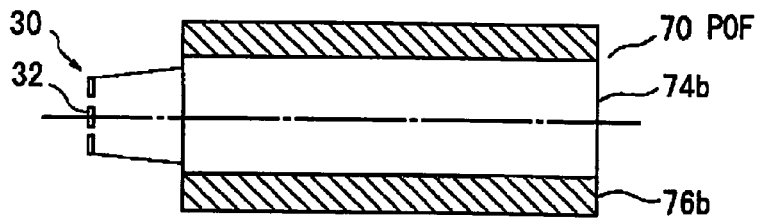

In addition, FIGS. 7C and 7D show relationships between the light source 30 and the optical fiber 70 when the lights emitted from the light source 30 enter the optical fiber 70. In this case, the light emitted from the central VCSEL 32 enters the core 74a, when MMF is connected. The lights emitted from all the VCSELs enter a core 74b. The distance from the light source 30 to the incident surface of the optical fiber 70 is approximately set in view of a divergence angle from the VCSELs.

Figure 8:
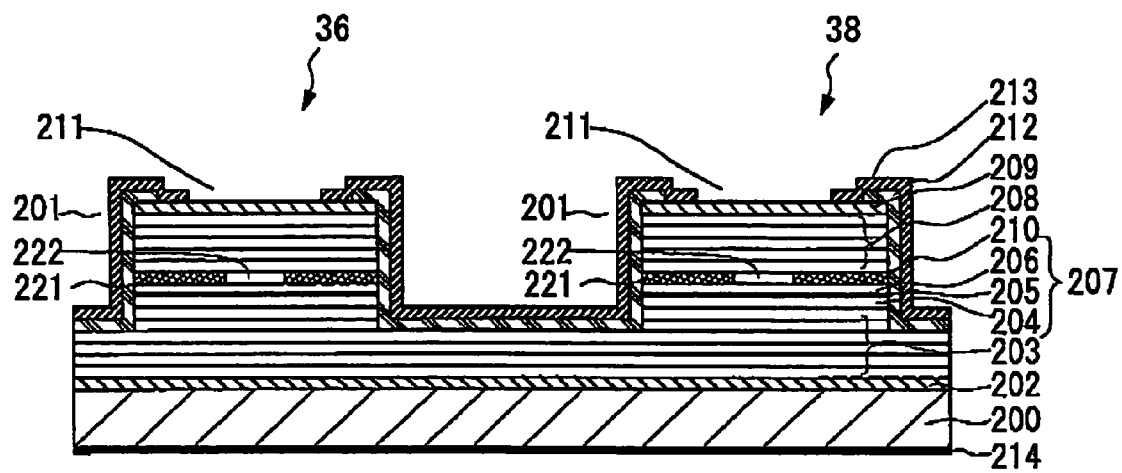
FIG. 8 is a cross-sectional perspective view taken along a line X—X of the light source 30 shown in FIG. 2.

Next, a description will be given of a configuration of the VCSELs in the light source 30. FIG. 8 is a cross-sectional perspective view taken along a line X-X of the light source 30 shown in FIG. 2. That is to say, FIG. 8 is a cross-sectional view of the VCSELS 36 and 38. The VCSELs 36 and 38 have the same configurations.

The VCSELs 36 and 38 are arranged on an n-type GaAs substrate 200. Referring to FIG. 8, an n-type buffer layer 202, an n-type lower DBR (Distributed Bragg Reflector) 203, an active region 207 including an undoped lower spacer 204, an undoped quantum well active layer 205, and an undoped upper spacer layer 206, a p-type upper DBR 208 and a p-type contact layer 209 are sequentially laminated on the n-type GaAs substrate 200. A mesa 201 is formed by anisotropically etching of the above-mentioned semiconductor layers. The mesas 201 of the VCSELs 36 and 38 have the same size, and the distance between the centers of the mesas is approximately 50 μm.

Next, an interlayer insulation film 212 covers a sidewall and an upper surface of the mesa 201. A round opening is provided on the interlayer insulation film 212 provided on the contact layer 209. A p-side electrode layer 213 is arranged around the opening and forms an ohmic connection with the contact layer 209. A laser output window 211 is arranged at the center of the p-side electrode 213 of the VCSELs 36 and 38 so as to emit the laser beam.

The p-side electrode layer 213 is commonly shared by the VCSELs 36 and 38 and extends to an electrode pad (not shown) provided on the bottom of the mesa. A p-type AlAs layer 210 is inserted into a lowermost layer of the upper DBR 208. The AlAs layer 210 includes a round current-conducting section 222 surrounded by an oxidization area 221, which is partially oxidized from the sidewall of the mesa 201. The oxidization area 221 confines the light and blocks the current. An n-type electrode 214, which is commonly shared by the VCSELs 36 and 38, is arranged on the backside of the substrate 1.

The lower DBR 203 is a multilayered laminated body of an n-type $Al_{0.9}Ga_{0.1}As$ layer and an n-type $Al_{0.3}Ga_{0.7}As$ layer. Each layer has a thickness of λ/4 nr (here, λ denotes an emission wavelength and nr denotes a refractive index of a medium), and the above-mentioned layers are alternately laminated at 40.5 cycles. A carrier concentration is $3 \times 10^{18}$ $cm^{-3}$ after silicon, which is an n-type impurity, is doped.

The lower spacer 204 of the active region 207 is an undoped $Al_{0.6}Ga_{0.4}As$ layer. The undoped quantum well active layer 205 includes an undoped $Al_{0.11}Ga_{0.89}As$ quantum well layer and an undoped $Al_{0.3}Ga_{0.7}As$ barrier layer. The undoped upper spacer layer 206 is the undoped $Al_{0.6}G_{0.4}As$ layer.

The upper DBR 208 is a laminated body of a p-type $Al_{0.9}Ga_{0.1}As$ layer and a p-type $Al_{0.3}Ga_{0.7}As$ layer. Each layer has a thickness of λ/4 nr (here, λ denotes an emission wavelength and nr denotes a refractive index of a medium), and the above-mentioned layers are alternately laminated at 30 cycles. The carrier concentration is $3 \times 10^{18}$ $cm^{-3}$ after carbon, which is a p-type impurity, is doped. The p-type contact layer 209 is a GaAs layer and has a thickness of 20 nm. The carbon concentration is $1 \times 10^{20}$ $cm^{-3}$. The p-side electrode layer 213 is a film stack of Ti and Au.

Only the VCSELs 36 and 38 are shown in FIG. 8; however, other VCSELs 32 and 34 are also formed on the substrate with the same process. In addition, as shown in FIG. 5, in the case where the VCSELs are separately driven, for example, the p-side electrode 213 may be patterned separately to form the electrode pads for respective VCSELs.

Further, an external diameter of the mesa of the central VCSEL 32 may be greater than those of the mesas of the remaining VCSELs. This can be realized by changing the mask pattern used for etching the semiconductor layers. It is thus possible to make the output of the central VCSEL 32 greater than those of the remaining VCSELS.

Figure 9:
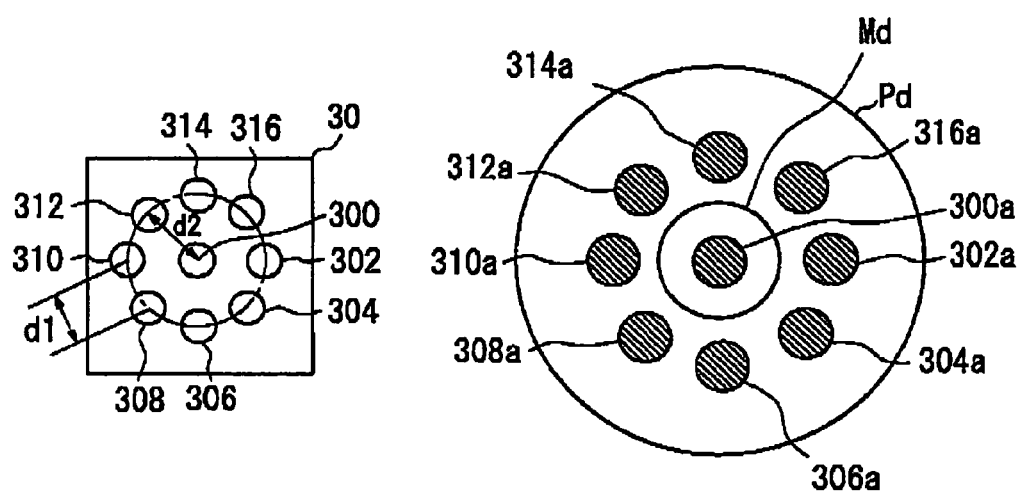
FIG. 9 shows another layout of the VCSEL in accordance with the embodiment of the present invention.

FIG. 9 shows another layout of the VCSEL in accordance with the embodiment of the present invention. Referring to FIG. 9, a VCSEL 300, which corresponds to the light source 30, is surrounded by eight VCSELs 302, 304, 306, 308, 310, 312, 314, and 316. An image 300a of the central VCSEL 300 is included in the core diameter Md, and images 304a through 316a are included in the core diameter Pd. Distances d1 between the respective surrounding VCSELs are equal to a distance d2 between the central VCSEL 300 and each of the surrounding VCSELs. However, the distance d1 and the distance d2 may be different.

The surrounding VCSELS (except for the central VCSEL 300) are equally spaced, and the thermal effect (temperature rise) caused by adjacent VCSELs is equalized in each VCSEL. The optical output is affected by the temperature, and the optical output from each VCSEL is equal. Thus, light intensity distribution becomes equal, and it is easy to conduct the optical connection with the optical fibers The wavelength is shifted equally by the thermal effect, and laser emission spectrum width of all the VCSELs becomes small. It is thus possible to minimize the slowdown of the transmission speed caused resulting from dispersion, while the optical communication is being performed. Further, the respective VCSELs have equal life reduction speeds caused resulting from the temperature rise or have equal deterioration with age of the optical output. It is thus possible to predict the optical output and the change in basic characteristics with time.

Figure 10:
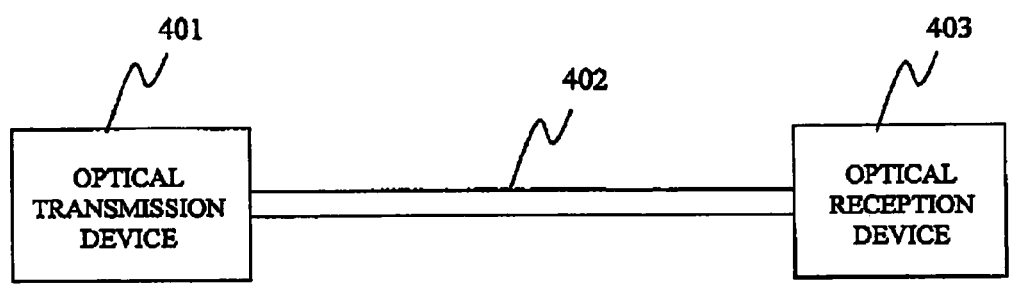
FIG. 10 is an example of an optical transmission system with an optical transmission device in accordance with the embodiment of present invention.

FIG. 10 is an example of an optical transmission system with an optical transmission device in accordance with the present invention. The optical transmission system includes an optical transmission device 401, an optical transmission medium 402 for transmitting the optical signals such as an optical fiber, and an optical reception device 403 for receiving the optical signals. The optical reception device 403 includes an optical system for collecting laser lights, a photodetector, and a control circuit.

Although the embodiment of the present invention has been shown and described, it would be appreciated by those skilled in the art that changes may be made in these embodiments without departing from the principles and spirit of the invention, the scope of which is defined in the claims and their equivalents.

For instance, in the embodiment mentioned above, POF has been mentioned as an example of the optical fiber having a great core diameter and MMF has been mentioned as an example of the optical fiber having a small core diameter. However, the present invention is not limited to the above-mentioned examples SMF or other optical fibers may be used.

In addition, the layouts mentioned and described above are preferable examples; however, the present invention is not limited to those examples. The configuration of the VCSEL shown in FIG. 8 is also an example, and the laser emission wavelength may not be 780 nm. The laser beam may not be limited to multimode, and maybe single mode. Further, preferably POF is the GI type, but not limited to the GI type, and may be an SI (Stepped Index) type.

The entire disclosure of Japanese Patent Application No. 2004-019497 filed on Jan. 28, 2004 including specification, claims, drawings, and abstract is incorporated herein by reference in its entirety.

What is claimed is:

1. An optical transmission device comprising:
    a single chip light source including light-emitting regions; and an optical fiber that transmits lights emitted from the light-emitting regions,
    the single chip light source including a first light-emitting region positioned at a place that corresponds to an optical axis of the optical fiber, and a second light-emitting region positioned at places that surround the first light-emitting region;
    a light emitted from the first light-emitting region entering a first core of a first optical fiber having a first core diameter, in a case where the first optical fiber is connected to the optical transmission device,
    lights emitted from the first and second light-emitting regions entering a second core of a second optical fiber having a second core diameter greater than the first core diameter when the second optical fiber is connected to the optical transmission device; and
    an antireflection film provided in an area other than the first core on an incident surface of the first optical fiber,
    the light emitted from the second light-emitting region enters the antireflection film when the first optical fiber is connected to the optical transmission device,
    wherein the first light-emitting region and the second light-emitting region emit lights of an identical wavelength.

2. The optical transmission device as claimed in claim 1, wherein the second light-emitting region has multiple light-emitting regions equally spaced from a center of the first light-emitting region.

3. The optical transmission device as claimed in claim 1, wherein the second light-emitting region has multiple light-emitting regions formed at vertexes of a regular triangle, and the first light-emitting region is positioned at a center of gravity.

4. The optical transmission device as claimed in claim 1, wherein the second light-emitting region has multiple light-emitting regions positioned on a circumference of a circle, a center of which coincides with a center of the first light-emitting region.

5. The optical transmission device as claimed in claim 1, wherein the second light-emitting region area has multiple light-emitting regions positioned asymmetrically with respect to the first light-emitting region.

6. The optical transmission device as claimed in claim 1, wherein the second light-emitting region has multiple light-emitting regions positioned symmetrically with respect to the first light-emitting region.

7. The optical transmission device as claimed in claim 1, wherein the second light-emitting region is different in shape and/or size from the first light-emitting region.

8. The optical transmission device as claimed in claim 1, wherein the second light-emitting region has multiple light-emitting regions equally spaced from one another.

9. The optical transmission device as claimed in claim 1, wherein a quantity of the light emitted from the first light-emitting region and a total of quantities of lights emitted from the first and second light-emitting regions have a ratio of 1:4 or less.

10. The optical transmission device as claimed in claim 1, wherein the first and second light-emitting regions include multiple vertical cavity surface-emitting laser diodes arranged on a single substrate.

11. The optical transmission device as claimed in claim 10, wherein laser beams emitted from the first and second light-emitting regions fall in a 780 nm band.

12. The optical transmission device as claimed in claim 10, wherein the first and second light-emitting regions emit multimode laser beams.

13. The optical transmission device as claimed in claim 10, wherein the second optical fiber is a GI(graded Index)-type plastic fiber.

14. The optical transmission device as claimed in claim 1, wherein:
    the first optical fiber having the first core diameter is a multimode glass optical fiber; and
    the second optical fiber having the second core diameter is a plastic fiber.

15. The optical transmission device as claimed in claim 1, further comprising an optical lens arranged between the light source and the optical fiber.

16. The optical transmission device as claimed in claim 1, further comprising a drive circuit that stops an emission from the second light-emitting region, when the first optical fiber is connected to the optical transmission device.

17. The optical transmission device as claimed in claim 1, wherein the light emitted from the first light-emitting region has a quantity greater than each quantity of light emitted from each light-emitting region included in the second light-emitting region.

18. An optical transmission system comprising:
    an optical transmission device; and
    an optical reception device,
    the optical transmission device comprising a single chip light source including light-emitting regions and an optical fiber that transmits lights emitted from the light-emitting regions,
    the light source including a first light-emitting region positioned at a place that corresponds to an optical axis of the optical fiber, and a second light-emitting region positioned at places that surround the first light-emitting region;
    a light emitted from the first light-emitting region entering a first core of a first optical fiber having a first core diameter, in a case where the first optical fiber is connected to the optical transmission device,
    lights emitted from the first and second light-emitting regions entering a second core of a second optical fiber having a second core diameter greater than the first core diameter when the second optical fiber is connected to the optical transmission device; and
    an antireflection film provided in an area other than the first core on an incident surface of the first optical fiber,
    the light emitted from the second light-emitting region enters the antireflection film when the first optical fiber is connected to the optical transmission device,
    wherein the first light-emitting region and the second light-emitting region emit lights of an identical wavelength.

19. An optical transmission device comprising:
    a single chip light source including light-emitting regions; and an optical fiber that transmits lights emitted from the light-emitting regions,
    the single chip light source including a first light-emitting region positioned at a place that corresponds to an optical axis of the optical fiber, and a second light-emitting region positioned at places that surround the first light-emitting region;
    a light emitted from the first light-emitting region entering a first core of a first optical fiber having a first core diameter, in a case where the first optical fiber is connected to the optical transmission device, lights emitted from the first and second light-emitting regions entering a second core of a second optical fiber having a second core diameter greater than the first core diameter when the second optical fiber is connected to the optical transmission device; and a drive circuit that stops an emission from the second light-emitting region, when the first optical fiber is connected to the optical transmission device, wherein the first light-emitting region and the second light-emitting region emit lights of an identical wavelength.

* * * * *